Figure 1:
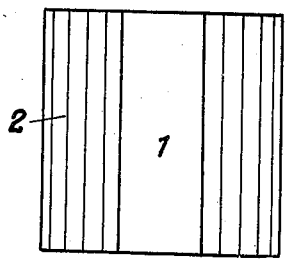
Figure 2:
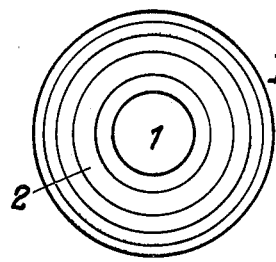
Figure 3:
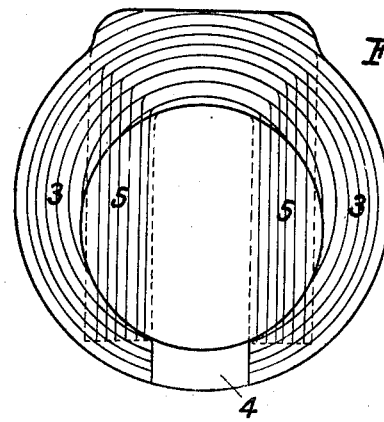
Figure 4:
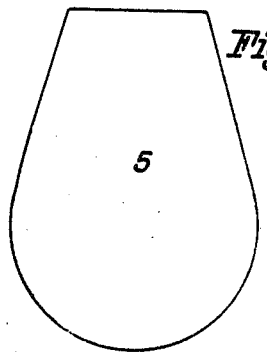

March 19, 1935.  F. W. NIERHAUS  1,994,863
METHOD OF MANUFACTURING FORGED, PRESSED, OR ROLLED
WORK PIECES, ESPECIALLY CRANK SHAFTS
Filed Aug. 13, 1931   2 Sheets-Sheet 2

Inventor:
F. W. Nierhaus
By: Marks & Clerk
Attys.

ced Mar. 19, 1935

UNITED STATES PATENT OFFICE 1,994,863

METHOD OF MANUFACTURING FORGED, PRESSED, OR ROLLED WORK PIECES, ESPECIALLY CRANK SHAFTS

Friedrich Wilhelm Nierhaus, Dortmund, Germany, assignor to the firm Vereinigte Stahlwerke Aktiengesellschaft, Dusseldorf, Germany Application August 13, 1931, Serial No. 556,914
In Germany March 15, 1929

9 Claims. (Cl. 29—6)

The present invention relates to a method of manufacturing heavy forgeable work pieces, such as are employed for example, in shipbuilding, and it also relates to the resulting products themselves. Existing methods are attended with the inconvenience that owing to the use of complete ingots as blanks, the material can only be imperfectly worked by forging, and the disposition of the fibres in the forged material is, in part, very unfavourable. Moreover, the zones containing the pipes and segregations remain in the finished forgings, and mostly occur at precisely those parts which are subjected to the greatest stresses.

According to the present invention, these drawbacks are obviated by using ingots from which the zones containing the pipes and segregations have been removed, and rolling, forging or "drumming" the ingots in such a manner that finished pieces possessing highly valuable properties are obtained from the annular or cylindrical intermediate pieces by flat-pressing and dividing, or dividing and bending.

The method is specially suitable for the production of crank shafts, single cranks and shaft brackets.

In the case of crank shafts and single cranks, the procedure consists in employing as blanks, raw ingots, which may have been rough-forged, and from which the zone containing the pipe and segregations has been removed by boring or perforating. The resulting cylindrical blank is rolled, forged or "drummed" in such a manner that the final shaping to a crank shaft or crank is obtained by flat-pressing and dividing, or dividing and bending these annular or cylindrical intermediate pieces.

The boring or perforating of the raw ingot, after detaching the "gate", affords a guarantee that no zone containing pipes or segregations remains in the resulting cylindrical blank.

Moreover, in the production of crank shafts or cranks, the new method has the substantial advantages that the kneading of the material of these cylindrical blanks is more effectual than in the case of the existing method of producing forgings from complete ingots, and that the arrangement of the fibres is of the most suitable character.

In making single cranks, the preferred method is to squeeze the (e. g. "drummed") intermediate pieces into a flattened ring, with the aid of a bridge piece, the flat sides of the ring forming the webs of the crank, the flattened ring being then shaped into a single crank after opening and further working, or else divided and formed into two or more cranks.

It is also possible to divide the rolled, forged or "drummed" intermediate pieces in the first place, and then form the cranks by bending the ends of the resulting sections of the rings.

This latter enables one, two, three or more cranks to be made from a single annular intermediate piece, according to the size of crank required. The method is of particular importance in the production of heavy long-throw cranks, which could not hitherto be satisfactorily made in one piece, owing to the large dimensions of the raw ingots required.

Crank webs and pieces of similar design to cranks can also be advantageously produced in the same manner.

In order more clearly to understand the nature of the present invention, reference is made to the accompanying drawings which illustrate diagrammatically and by way of example, several typical embodiments of the invention representing the course of forming the products.

Figs. 1 to 4 show in various aspects, the production of a crank. The cast and, if desired, rough-forged ingot is freed from the zone 1, containing the pipe and segregations by boring or piercing, in known manner, whereupon the now cylindrical blank 2 is forged into the cylindrical intermediate piece 3.

After flattening, opening at 4, bending up and if desired, expanding further by means of a bridge, the crank 5 represented by the broken lines is obtained.

Figure 5:
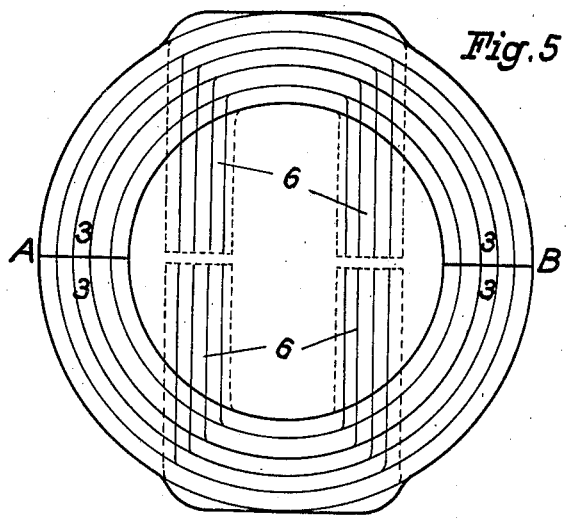
Figure 6:
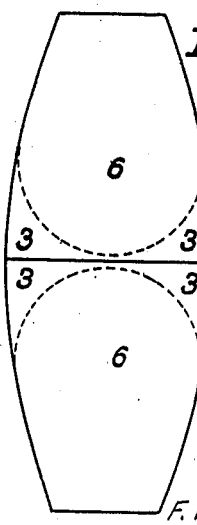

According to Figs. 5 and 6, the intermediate piece 3 is compressed (after the insertion of a bridge) to a flattened ring, as indicated by the broken lines. After further working, two cranks 6 are formed by dividing this flattened ring along the line A—B.

As can be seen from the indicated disposition of the fibres, the method also affords the substantial advantage that the fibres are not subjected to any sharp kinking at the places where the crank pin merges into the webs, since the fibres already run in a cylindrical direction in the annular piece, whereas, in the case of cranks bent from straight slabs by the existing methods, the fibres undergo a sharp change of direction at the places in question, which are actually the most dangerous cross-sectional points, and cranks shaped out of the solid show ruptured fibres at these points.

Instead of first compressing the cylindrical blank to a flattened ring, with the aid of an inserted bridge, and then dividing the ring, the cylindrical blank may be first divided and then formed into cranks by bending the ends of the resulting annular segments.

Figure 7:
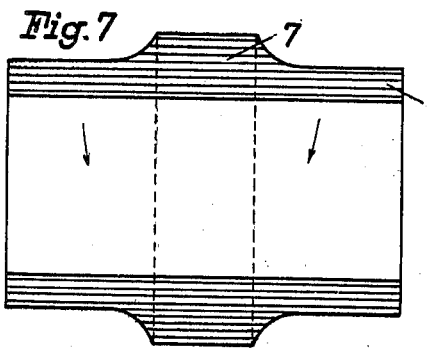
Figure 8:
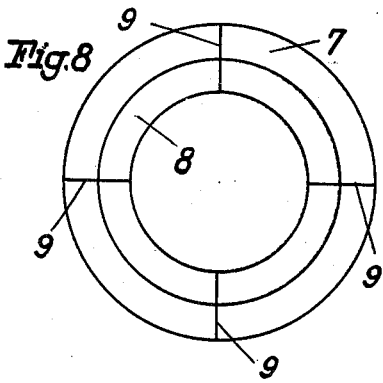

Figs. 7 and 8 represent, in section and end elevation, another method of carrying out the invention. The cylindrically bored blank is "drummed" and stretched over a mandrel so as to form a cylindrical partly finished piece 8 provided with an annular ridge 7, said piece being then divided by radial cuts 9, into a number of slabs which are then formed into cranks by bending their ends round, as indicated by arrows in Fig. 7.

Figure 9:
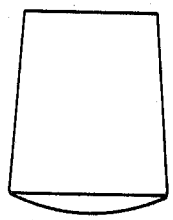
Figure 10:
Figure 11:
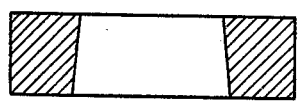
Figure 12:
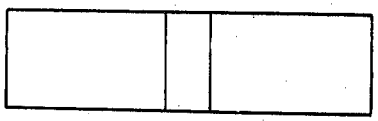
Figure 13:
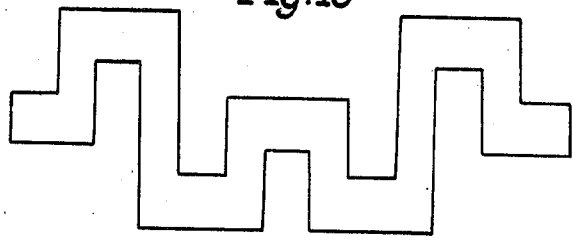

Figs. 9 to 13 show the course of formation, according to the invention, of a 4-throw crank shaft for motor vehicles. The raw ingot, Fig. 9, is upset and transformed into a cylindrical blank (Fig. 10) by boring or piercing in known manner. Subsequent rolling produces the annular half-finished piece according to Fig. 11. After cutting the ring open and straightening it out, in known manner, the crank shaft according to Fig. 13 is formed from the flat slab (Fig. 12)—which is free from pipes and segregations—by bending and further working.

Figure 14:
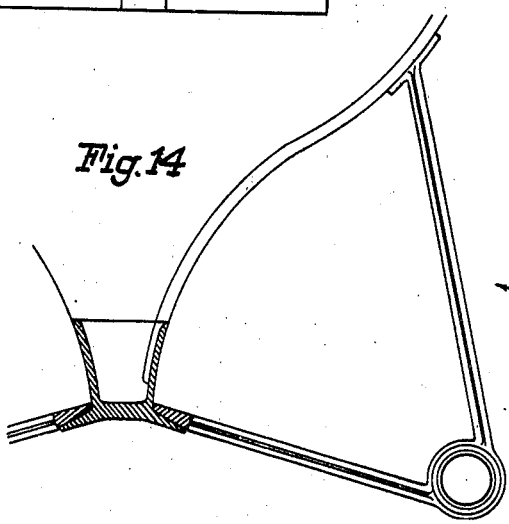
Figure 15:
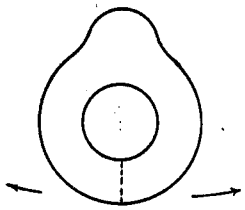

Figs 14 and 15 represent the application of the invention to the production of forgeable shaft brackets. The current method of making such brackets by bending the ends of a slab or splitting it open, exhibit the serious defect that the comparatively slender forged arms of the bracket really consist solely of the original inferior core zone or contain the segregation zone right across the whole of the bore. In contrast therewith, the brackets produced in accordance with the invention are manufactured by removing the zone containing the pipe and segregations from the raw ingots—rough-forged if desired—prior to further treatment. The final products obtained in this manner are fully capable of meeting all the stresses to which they will be subjected.

Fig. 14 is an elevation of such a finished shaft bracket, whilst Fig. 15 represents the formation of a shaft bracket from a raw ingot which has been freed from the pipe and segregation zone.

I claim:—

1. A method of manufacturing cranks consisting in forging a hollow cylindrical work-piece which is produced by removing the inferior core zone of a raw ingot forming an annular intermediate piece, compressing the same laterally so as to form a flattened ring, the flat sides of which correspond to the webs of the crank to be produced, then opening the said flattened ring at one end of the flat sides and finishing it to a single crank.

2. A method of manufacturing cranks consisting in forging a hollow cylindrical work-piece which is produced by removing the inferior core zone of a raw ingot forming an annular intermediate piece, compressing the same laterally so as to form a flattened ring the flat sides of which correspond to the webs of the cranks to be produced, then cutting the said flattened ring open in the midst of its flat sides so that two crank-shaped pieces are obtained, and finishing the cranks.

3. A method of manufacturing cranks consisting in forging and drumming a hollow-cylindrical work-piece which is produced by boring out the zone containing pipes and segregations from a cylindrical raw ingot forming an annular intermediate piece, squeezing the said intermediate piece laterally over an inserted bridge piece so as to form a flattened ring, the flat sides of which represent the webs of the crank to be produced, then cutting the said ring open at one end of the flat sides and finishing it to a single crank.

4. A method of manufacturing cranks consisting in forging and drumming a hollow-cylindrical work-piece which is produced by boring out the zone containing pipes and segregations from a cylindrical raw ingot forming an annular intermediate piece, squeezing the said intermediate piece laterally over an inserted bridge piece so as to form a flattened ring, the flat sides of which represent the webs of the crank to be produced, then cutting the said flattened ring open in the midst of its flat sides so that two crank-shaped pieces are obtained, and finishing the cranks.

5. A method of manufacturing cranks consisting in drumming and stretching hollow cylindrical work-pieces which are produced by removing the zone containing pipes and segregations from cylindrical raw ingots over a mandrel into an intermediate piece provided with an annular ridge, dividing the said intermediate pieces by radial cuts into a number of slabs, the ridge portion of which represents the crank pin while the ends correspond to the crank cheeks, bending the ends of the slabs round and finishing the cranks.

6. A method of manufacturing cranks consisting in drumming and stretching hollow cylindrical work-pieces which are produced by removing the zone containing pipes and segregations from cylindrical raw ingots over a mandrel into an intermediate piece provided with an annular ridge, dividing the said intermediate pieces by radial cuts into a number of slabs, the ridge portion of which represents the crank pin while the ends correspond to the crank cheeks, flattening the slabs, bending the ends of the slabs round and finishing the cranks.

7. A method of manufacturing cranks consisting in removing the inferior core zone of a raw ingot so that a hollow body is formed, forging the hollow body to an annular intermediate piece having a thickening with a flat outside at one place of the periphery and a reducing wall thickness towards the side opposite the said thickening, laterally compressing the reducing wall parts of the intermediate piece so that the same are flattened and get a form substantially equal to that of the crank cheeks of the final crank, cutting out the wall part of the intermediate piece opposite the thickening, and finally forging the flattened sides to the crank cheeks and the thickening to the crank pin of the desired crank.

8. A method of manufacturing cranks consisting in removing the inferior core zone of a raw ingot so that a hollow body is formed, forging the hollow body to an annular intermediate piece having two thickenings with flat outsides at the periphery lying opposite one another, compressing laterally the parts of the intermediate piece lying between the said thickenings so that the said parts are flattened and get a form substantially equal to that of the final crank cheeks, dividing the intermediate piece by radial cuts through the midst of the said flattened parts into two symmetric halves, and finally forging the flattened parts of the halves to the cheeks of two cranks and the thickenings to the pins of these cranks.

9. A method of manufacturing cranks, consisting in removing the inferior core zone of a raw ingot so that a hollow body is formed, drumming and stretching the said hollow body over a mandrel into a hollow cylindrical intermediate piece provided with an annular ridge at the midst of the periphery, dividing said intermediate piece by radial cuts into several sections, flattening the sections so that the middle ridge portion corresponds to the crank pin and the ends correspond to the crank cheeks to be formed, then bending the ends round and finally forging the said sections to the cranks to be produced.

FRIEDRICH WILHELM NIERHAUS.